July 18, 1950

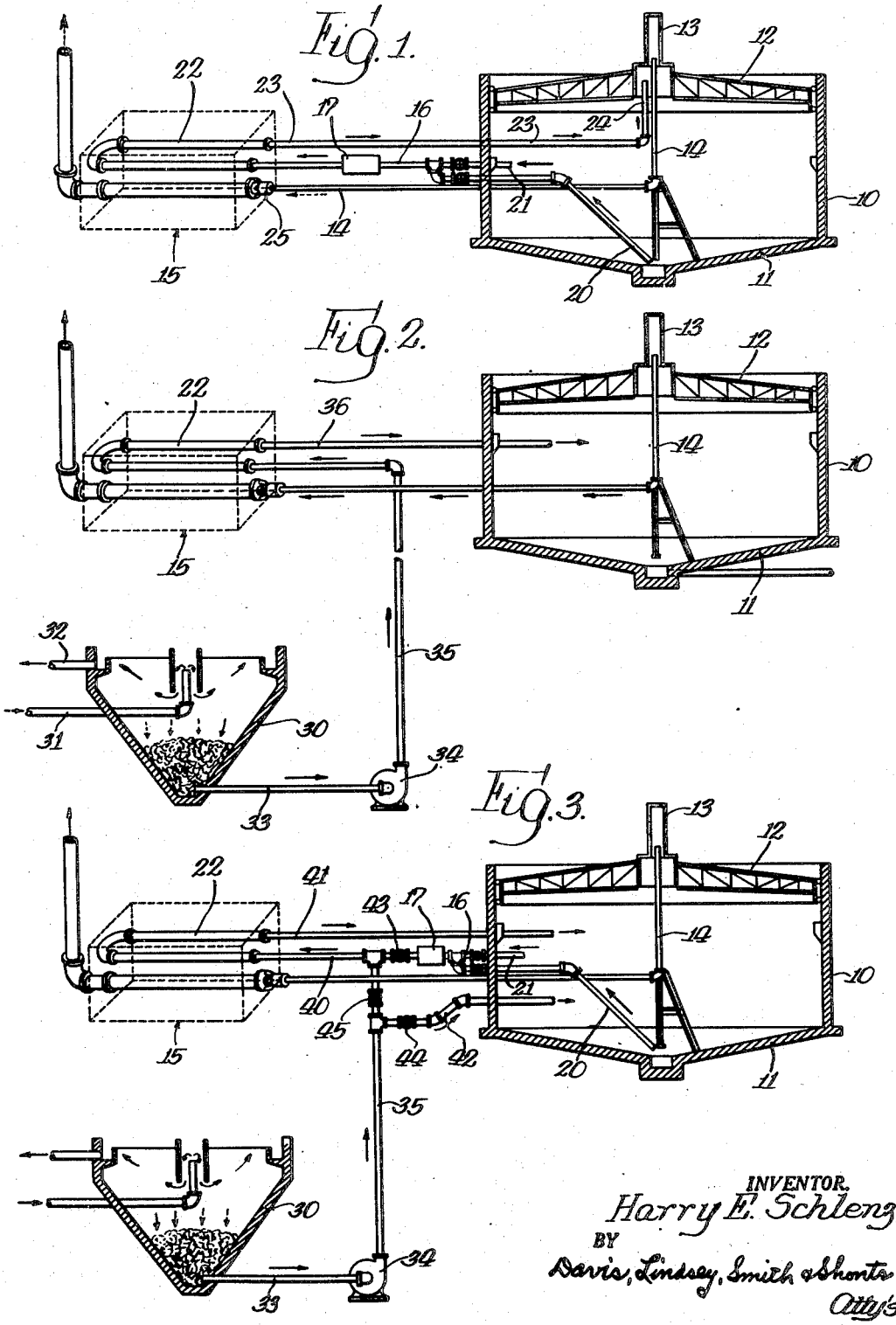

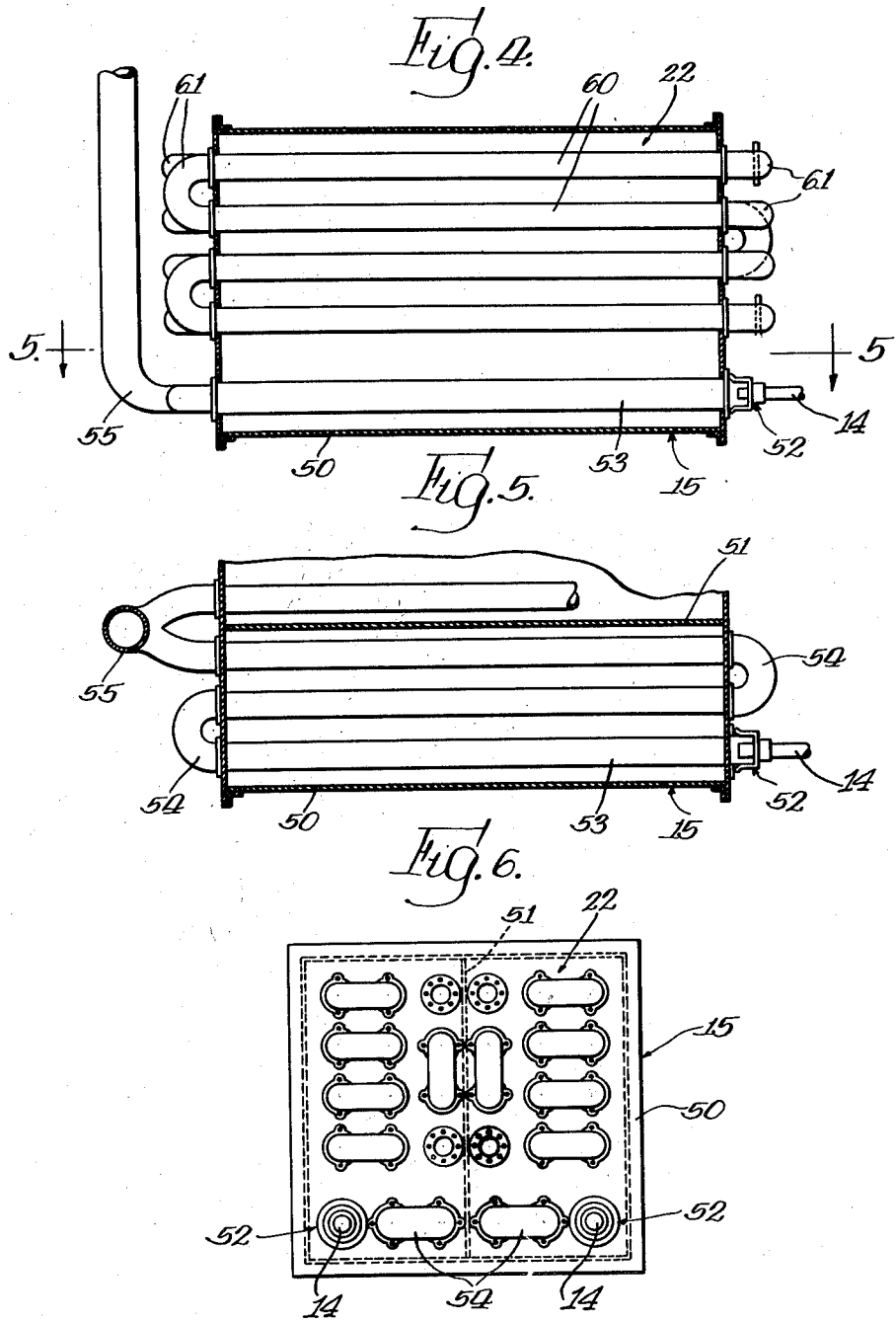

H. E. SCHLENZ
METHOD OF DIGESTING SEWAGE
SLUDGE OR TRADES WASTES 2,516,076

Filed Dec. 9, 1944

INVENTOR.
Harry E. Schlenz,
BY
Davis, Lindsey, Smith & Shonts
Attys.

Patented July 18, 1950

2,516,076

UNITED STATES PATENT OFFICE 2,516,076

METHOD OF DIGESTING SEWAGE SLUDGE OR TRADES WASTES

Harry E. Schlenz, Glencoe, Ill., assignor to Pacific Flush Tank Company, Chicago, Ill., a corporation of Illinois Application December 9, 1944, Serial No. 567,408

7 Claims. (Cl. 210—2)

The invention relates generally to the digestion of sewage sludge or trades wastes and, more particularly, to an apparatus for and method of digesting such materials under proper conditions of temperature.

In the digestion of sludge separated from domestic sewage or trades wastes, it is necessary to maintain an optimum temperature of the digesting mass to attain the highest rate of digestion. This is due to the fact that the digestion of organic matter is dependent upon the action of micro-organisms which require a warm environment.

Heretofore the necessary heat, in an effort to maintain optimum conditions in the digestion tank, has been provided by heating water in a standard gas-fired water-tube heater or boiler and circulating the water by means of a pump through a series of coils immersed in the digesting mass in the digestion tank, the water so circulated giving up its heat by heat transfer to the contents of the tank. Normally the gas generated as an end product of the digestion process, which gas is high in methane content, is used as a fuel in the boiler. Such a system has been in almost universal use in the field of sewage sludge digestion and trades wastes digestion or fermentation but has a number of disadvantages.

Unless the temperature of the circulated water is carefully controlled at below 140° F., the sludge in contact with the heat transfer coil in the digestion tank is scorched or burned and builds up upon the coil. The crust or cake of sludge thus formed tends to act as an insulation and interferes with the proper transfer of heat from the circulated water in the coil to the sludge in the tank. It is then necessary to dewater the tank, disrupting the digester process, to knock the scale or crust from the coil. This is a laborious and expensive procedure.

Furthermore, to circulate 140° F. water through the system causes a serious condition at the boiler, since the gas when burned releases moisture and sulphur compounds which tend to condense on the coils or boiler sections confining the relatively low temperature circulating water in the boiler. These condensed moisture and sulphur compounds form sulphuric acid which results in rapid deterioration of the boiler.

The use of a thermostatically controlled valve and by-pass line has been resorted to, to allow operation of the boiler at a higher temperature by bleeding water at approximately 180° F. from the boiler coil into the circulating system, thereby maintaining the water in circulation through the coils in the digestion tank at less than 140° F. This procedure does not completely eliminate the above-mentioned difficulties but merely increases the life of the boiler and lengthens the period between cleaning of the coils in the digester. However, due to the temperature limitation in the circulating water, it is necessary to provide a large amount of pipe surface for the coils in the digester to effect the necessary heat exchange, and such coils are at an inaccessible location in the digesting mass.

The general object of the invention therefore is to provide a novel method of and apparatus for maintaining sludge, during digestion thereof, at the optimum temperature for such digestion uniformly throughout the mass of sludge.

Another object is to provide apparatus for supplying heat to sludge during the digestion thereof, which avoids the necessity of utilizing any heating coils in the digestion tank where they would be relatively inaccessible.

It is also an object to provide apparatus for digesting sludge, which includes a means for supplying heat to the sludge capable of operating without interruption, by withdrawing sludge or supernatant liquor from the digestion tank and passing it through heating coils positioned externally of the digestion tank and arranged in sections interconnected in such a manner as to permit cleaning of one section while the other section or sections continue to operate, the heating means thereby being maintained at peak efficiency at all times.

A further object is to provide for the heating of sludge during the digestion thereof without the utilization of heating coils or the like in the digestion tank.

Another object is to provide a novel method of digesting sludge wherein the material to be digested is fed to the digestion zone in a preheated state sufficient for digestion without further heating except that afforded by the addition of preheated material to the digesting mass.

A further object is to provide an apparatus for maintaining the contents of a digestion tank at the desired temperature by circulating a portion of such contents through a heating means positioned outside of the tank, with the rate of circulation sufficiently high to prevent caking or crusting of the sludge at any point in the apparatus, such high rate of circulation producing a turbulent flow to increase the heat transfer coefficient of the apparatus and permitting use of a relatively small coil area to effect the heat transfer.

Still another object is to provide apparatus for supplying heat to the contents of a sludge digestion tank, utilizing the gas generated during digestion as a source of heat, the apparatus being so constructed that deposit of moisture and sulphur compounds resulting from combustion of the gas as well as scaling of the coils in the heating apparatus are substantially eliminated.

Still another object is to provide apparatus for digesting sewage sludge and including a means for maintaining such sludge at the optimum temperature for digestion, said means effecting a highly efficient transfer of heat from the source of heat to the contents of the digestion tank.

Still another object is to provide apparatus for heating the contents of a digestion tank by circulating a portion of such contents through a heating means, the apparatus being so arranged that the heated material may be returned to the digestion tank at a point where the heat produces the greatest benefit to the process of digestion, such as directing the heated material to the scum covering the surface of the contents of the tank to increase the rate of digestion thereof by softening it.

Another object is to provide apparatus for digesting sewage sludge provided with means for heating the sludge, in which fully automatic operation may be attained through relatively simple controls requiring a small expenditure of time and labor to maintain the apparatus at its peak efficiency.

A further object is to provide apparatus for digesting sewage sludge, in which the contents of the digestion tank may be circulated through a heating means to maintain such contents at a desirable temperature, the apparatus being so constructed that either sludge from the bottom of the tank or supernatant liquor from an intermediate zone within the tank may be withdrawn for such heating.

Still another object is to provide apparatus for digesting sewage sludge and including means for heating raw sludge as it is added to the digestion tank to quickly establish proper temperature conditions for digestion thereof and thus hasten the digestion process.

A further object is to provide apparatus for supplying heat to a sewage sludge digestion tank by circulating a portion of the contents through an external heating means, or by heating raw sludge at the time it is added to the tank, or by intermittently circulating a portion of the contents through a heater and introducing preheated raw sludge into the tank, or by premixing and heating when in the mixed state raw sludge to be added to the tank and seeded sludge withdrawn from the tank to initiate digestion of the raw sludge at an early stage.

Other objects and advantages will become apparent from the following description taken in connection with the accompanying drawings, in which:

Figure 1 is a diagrammatic view of one form of apparatus embodying the features of the invention and by which my improved method may be carried out;

Fig. 2 is a similar diagrammatic view of another form of apparatus for carrying out my method;

Fig. 3 is a view of still another form of apparatus;

Fig. 4 is a vertical sectional view through a heater utilized in the apparatuses shown in Figs. 1, 2 and 3;

Fig. 5 is a fragmentary horizontal sectional view taken on the line 5—5 of Fig. 4;

Fig. 6 is a view of the right-hand end of the heater shown in Fig. 4;

Figure 7:
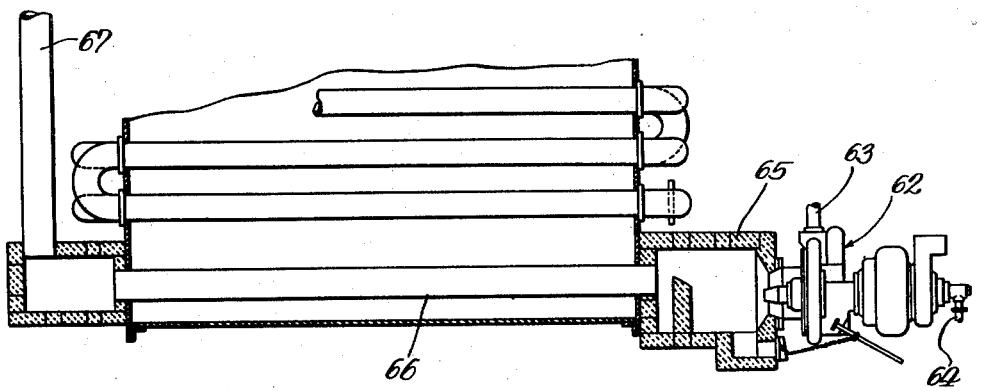
Fig. 7 is a fragmentary vertical sectional view, similar to Fig. 4, of another form of heater.

In carrying out my invention I preferably employ means outside of a digestion tank for heating undigested sludge, and means for discharging the heated sludge into the digestion tank. Since the heat loss in the digesting tank occurs through radiation, the heated sludge is preferably supplied to the digestion tank at a temperature sufficiently above the optimum temperature for effecting digestion that, when the heated sludge becomes mixed with the contents of the digestion tank, the latter is maintained at the desired temperature. The sludge which is heated may be either sludge withdrawn from the digestion tank or raw sludge to be supplied to the tank. Where the apparatus is so arranged as to provide for heating of material withdrawn from the digestion tank, the structure is such that either sludge from a point adjacent the bottom of the tank may be withdrawn to be heated or supernatant liquor from a point intermediate the top or scum line in the tank and the bottom may be withdrawn.

In the drawings, the form of apparatus shown in Fig. 1 comprises a digestion tank 10 of usual form and construction. Such a tank may have a slanting bottom wall 11 with the sludge as it becomes digested tending to settle in the area immediately adjacent the bottom. The tank is also provided with a roof or cover 12 having a gas dome 13 to collect gas generated during the digesting process. The gas from the dome 13 may be withdrawn by means of a pipe 14.

Since the digestion of organic matter is dependent upon the action of micro-organisms, a relatively warm environment is necessary to maintain such action, particularly to have such action proceed at its maximum rate. The optimum digesting temperature should be between 85° to 100° F. Obviously, during most seasons of the year, and particularly during the winter months in cool climates, considerable radiation will take place from the digestion tank, tending to lower the temperature of the digesting mass and thus retard the action of the micro-organisms. To compensate for such radiation loss, heat must be supplied to the digesting tank.

The apparatus shown in Fig. 1 supplies such heat by heating material withdrawn from the tank, and then discharging the heated material into the tank so that the average temperature of the digesting mass is maintained at the proper point. Such circulation may be continuous throughout the digesting process so that the temperature in the digesting mass remains constant. To this end, I have provided a heater, indicated generally at 15, through which sludge is pumped and in which the sludge is heated to the necessary extent before being returned to the digestion tank 10. Thus I provide a pipe 16 and a pump 17 for withdrawing material from the digestion tank. The pipe 16 within the tank may have an extension 20 opening adjacent the bottom wall 11 of the tank 10 so that sludge may be withdrawn, and the pipe 16 may terminate at a point 21 intermediate the scum line and the bottom to withdraw supernatant liquor from the digesting tank. The pump 17 pumps the material withdrawn by means of the pipe 16 through a coil 22 in the heater 15, a more detailed description of which will hereinafter be given.

The coil 22 is connected with a discharge line 23 extending into the tank. Preferably the discharge of the heated material is effected at a point within the digestion tank to best effect digestion of the contents thereof. Since the scum which forms on the top of the digesting mass is the most difficult to digest, the pipe 23 has an upward extension 24 located generally centrally of the digesting tank 10 and adapted to discharge the heated material over the top of the scum. The heat thus conveyed to the scum tends to soften and dissipate it and bring seeding and active material in contact with the scum, thereby facilitating the digestion action.

The gas generated during the digestion process and withdrawn through the pipe 14 is preferably carried to a burner 25 where combustion takes place to provide the necessary source of heat in the heater 15.

By providing apparatus of this character, no heating coils within the digestion tank are used. Thus there is no necessity for shutting down operation of the digestion tank for the sole purpose of cleaning such coils and removing caked material that may form thereon. The apparatus effects a highly efficient transfer of heat since the heated material mixes directly with the contents of the tank. By discharging the heated material above the scum, the scum is softened and digestion thereof is thereby hastened. The apparatus may be operated fully automatically with relatively simple controls inasmuch as the burning of gas may be regulated by a thermostat located in the water bath, thereby maintaining the temperature of the water bath within optimum limits. The temperature of the water bath is in turn affected by the amount of material which must be heated by circulating through the sludge coils. The temperature of the digester may be maintained by a regulation of the amount of material circulated through the heating coils with such circulation controlled as desirable by a thermostat located in the digestion tank. Thus only a small expenditure of time and labor is required to maintain the apparatus at its peak efficiency with complete freedom from difficulties.

The apparatus shown in Fig. 2 of the drawings is similar to that shown in Fig. 1 in the broad aspect of supplying heated material to the contents of the digestion tank to maintain such contents at the desired temperature. However, in the apparatus of Fig. 2, the material which is heated is raw sludge which is heated before being placed in the digestion tank.

As shown herein, the apparatus of Fig. 2 comprises a digestion tank 10 which may be of the same construction as shown in Fig. 1 and has a gas pipe 14 for withdrawing gas generated during the digestion process. The sludge to be supplied to the digestion tank is taken from a settling tank 30 provided with a pipe 31 to supply raw sewage thereto. Settled sewage from the settling tank 30 may be withdrawn by a pipe 32. The sludge solids separated from the raw sewage liquor collect in the bottom of the settling tank 30 and are withdrawn therefrom by means of a pipe 33 connected to a pump 34. The discharge pipe of the pump, indicated at 35, is connected to the heating coil 22 of a heater 15 so that the raw sludge will be heated before being discharged into the digestion tank 10. The outlet from the heating coil 22, here indicated at 36, leads to the digestion tank 10 to discharge the heated material therein, the end of the pipe 36 within the tank 10 being located at any desirable place therein.

With the apparatus of Fig. 2, sludge material is heated by means located outside of the digestion tank, as in the case of the apparatus shown in Fig. 1, so that no heating coils within the digester need be used. By heating the raw sludge before introducing it into the digestion tank, there is no upsetting of the conditions within the tank as would occur if the unheated sludge were added. The apparatus provides for a highly efficient transfer of heat since the heated material is mixed directly with the contents of the tank, and the heated material may be directed within the tank to those points where the heat produces the greatest benefits, as in the case of the apparatus shown in Fig. 1. The control of the apparatus is simple and may be fully automatic as heretofore described in connection with the apparatus shown in Fig. 1.

In Fig. 3 of the drawings, I have shown apparatus which constitutes a combination of the apparatus shown in Fig. 1 and that shown in Fig. 2, so that it may be operated in the manner heretofore described for both of the above-mentioned forms. The apparatus of Fig. 3 comprises a digestion tank 10 of the form heretofore described and having a gas withdrawal pipe 14. Sludge may be withdrawn from the digestion tank by means of a pipe extension 20 or supernatant liquor from an opening 21 in a pipe 16 leading to a pump 17. The pump 17 in this instance has its outlet connected by means of a pipe 40 to the heating coil 22 of the form heretofore mentioned. The discharge from the heating coil 22 is carried to the digestion tank 10 by means of a pipe 41, the end of the pipe 41 within the tank 10 being placed at any desirable point, an extension similar to the extension 20 being provided if desired. With the apparatus thus far described, either sludge from the bottom of the tank 10 or supernatant liquor from an intermediate point therein may be passed through the heater 15 and returned to the digesting mass.

In some seasons of the year introduction of raw sewage sludge at the temperature of the settling tank, from which such sludge is withdrawn, would tend to lower the temperature of the digesting mass within the digestion tank 10 to too great an extent. To avoid such a condition the settling tank, indicated at 30, is connected through a pipe 33, a pump 34 and a pipe 35 to the pipe 40 leading to the coil 22 of the heater. Thus the raw sludge to be suplied to the digestion tank may be heated before being discharged into the tank. If it is desired to discharge the raw sludge directly into the digestion tank 10 without preheating it, a branch pipe 42 may be provided for the pipe 35 to discharge the sludge directly into the tank 10.

In order to provide for different modes of operation of the apparatus shown in Fig. 3, valve controls may be provided for the various pipes in the apparatus to control the flow therethrough. Thus, at the outlet side of the pump 17, I may provide a valve 43, and a valve 44 may be placed in the branch line 42 as well as a valve 45 in the pipe 35 beyond the connection of the branch line 42 and ahead of the connection of the pipe 35 with the pipe 40. With these various valves, the apparatus may be operated in a number of different ways. If it is desired to supply heat to the digestion tank merely by withdrawing material therefrom, heating the withdrawn material, and returning it to the digestion tank, the valve 43 is opened to permit the pump 17 to force material through the heating coil 22 from the digestion tank 10. The valve 45 is closed at this time so that none of the raw sludge will be carried through the heater. When it is desired to introduce raw sludge into the digestion tank, the valve 44 may be opened to permit direct entrance of raw sludge into the tank. Thus the operation of the apparatus of Fig. 3 in this manner is similar to the operation of the apparatus shown in Fig. 1.

When it is desired to operate the apparatus of Fig. 3 in the manner of the apparatus of Fig. 2, the valve 43 is closed so that no material will be withdrawn from the digestion tank. The valve 44 is likewise closed and the valve 45 is opened to permit raw sludge from the settling tank 30 to pass through the heating coil 22 and be discharged into the digestion tank 10.

The apparatus of Fig. 3 may also be operated in a manner combining the modes of operation of both Figs. 1 and 2. Thus the valves 43 and 44 may be closed and the valve 45 be opened to permit the passage of raw sludge through the heating coil 22 to be discharged into the digestion tank. Since raw sludge is usually pumped only three or four hours out of the twenty-four hours of the day, the heater 15 would have to have a relatively large capacity in order to maintain the temperature of the mass within the digestion tank at the desired point. Therefore during the hours when raw sludge is not being heated and supplied to the digestion tank, the valve 45 may be closed and the valve 43 opened to permit withdrawal of material from the tank and circulation thereof through the heater 15 and back to the tank. Thus heat will be supplied to the digestion tank through the entire time, the heat being supplied during certain hours by heating the raw sludge and during the remainder of the time by heating material withdrawn from the digestion tank and returning it to the digestion tank.

The apparatus of Fig. 3 is capable of still another mode of operation involving a mixture of raw sludge with material withdrawn from the digestion tank before being carried to the heating coil 22. Such mode of operation has a definite advantage in that seed sludge from the digester is mixed with the raw sludge at an early stage to initiate and hasten the digestion thereof. In this mode of operation, the valve 44 remains closed and the valves 43 and 45 are opened to the desired extent to permit both the pumps 17 and 34 to discharge material into the pipe 40 where the raw sludge is mixed with the seeded sludge from the digestion tank. The mixture is then heated in the coil 22 and carried to the digestion tank. Thus, with the apparatus of Fig. 3 various modes of operation may be utilized so that various temperature conditions may be readily met and the contents of the digestion tank will be readily held at the optimum for digestion.

In Figs. 4, 5 and 6 I have shown one form of heater which may be used with any of the apparatuses shown in Figs. 1, 2 and 3. The heater 15 preferably comprises a water basin 50 arranged in a plurality of sections by means of one or more intermediate walls 51. Each section may be provided with a burner, indicated generally at 52, for effecting combustion of the gas generated during the digestion process in the tank 10 and withdrawn through the pipe 14.

Combustion of the gas may take place within and the hot gases therefrom may pass through a coil 53 in the lower part of the tank 50 to heat water contained within the tank. In standard gas fired boilers used in the systems heretofore employed, considerable difficulty was experienced due to the moisture and sulphur compounds released due to the combustion of this type of gas. In the prior systems, these compounds tended to condense on the coils of the boiler sections confining the relatively low temperature water in the boiler, and the compounds formed sulphuric acid resulting in rapid deterioration of the boiler. With the present heater, the water in the tank 50 is heated to a substantially higher temperature than the water in the standard boiler heretofore employed, and no material condensation of the moisture and sulphur compounds takes place. Therefore the coils 53 are not subjected to such rapid deterioration as the water coils or boiler sections were in the previously used apparatus. No appreciable amount of scale can be formed since the water, which completely surrounds the flues or coils 53, is not changed so that scale forming material on the outside of the flues and coils is avoided. If any scale formation of the rapidly circulated material inside of the coils takes place, the construction is such as to permit them to be readily cleaned on the inside. To this end the various pipes comprising the coils 53 extend to the ends of the tank 50 and are connected externally thereof by means of return bends 54 which may be readily removed to facilitate cleaning of the coils. The coils from the various sections of the heater preferably all lead to a single stack 55, but are so arranged that any one of them may be shut off from communication with the stack 55 for cleaning purposes while the remainder continue to operate.

The heating coil 22 through which the sludge or supernatant to be heated is passed also has many distinct advantages not attainable in the apparatus heretofore used. In the prior apparatus, the heating coils within the digestion tank carried water at approximately 180° F. in order to supply sufficient heat to the digesting material within the tank. This tended to cause a burning of the sludge and a caking on the exterior of the pipes composing the coil, which materially reduced the efficiency of the apparatus. Removal of such cake or crust required shutdown of the apparatus and a consequent heavy expense for labor and time.

Caking in the coils 22, to any great extent, is prevented by pumping the material therethrough at a sufficiently rapid rate so that it does not become scorched or burned and thus cannot solidify in the coil. However, the coil 22 in the present instance is so constructed that what little caking may occur can be readily removed without necessitating a shutdown in the operation of the heater for any appreciable period. Moreover each section of the heater is provided with an independent coil, each comprising a plurality of pipes 60 connected externally of the tank 50 by means of return bends 61. The coil in any one section may be shut off from operation for cleaning while the coils in the remaining sections continue to operate. In larger installations, a number of units could be employed so that but a small capacity need be out of service at any time for cleaning.

Figure 8:
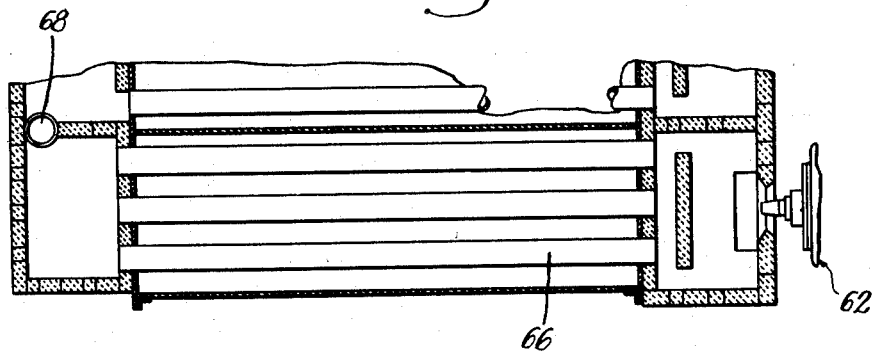
Fig. 8 is a fragmentary horizontal sectional view, similar to Fig. 5, but of the heater shown in Fig. 7.

In the heater shown in Figs. 7 and 8 of the drawings, a burner, indicated generally at 62, is shown which is adapted to effect combustion of both gas and oil, in case the supply of gas is insufficient. Thus the heater 62 is provided with a gas inlet 63 and an oil inlet 64, the necessary primary and secondary air being provided to effect complete combustion. With this form of burner, combustion may take place in a separate fire box 65 with the hot gases carried through flues 66 to a stack 67, the flues 66 in the various sections being adapted to be shut off from the stack 67 by means of a damper 68.

With a heater of either the form shown in Figs. 4, 5 and 6 or the form shown in Figs. 7 and 8, the complete apparatus is capable of operating without interruption since both the flues and the sludge heating coils in any one section may be cut out of service and cleaned while the flues and sludge coils in the other sections continue to operate. Both the flues and sludge coils are readily accessible for cleaning and thus permit a simple mode of maintaining the heater at its peak efficiency at all times. Caking of the sludge within the coils is to a great extent prevented by the high rate of circulation of the sludge, which also tends to increase the heat transfer coefficient of the heater and consequently permits a reduced coil area. The condensation of moisture and sulphur compounds resulting from combustion of the gas is reduced to a minimum since the water within the tank of the heater is maintained at a sufficiently high temperature to avoid such condensation.

The heater disclosed herein is disclosed and claimed in my copending application Serial No. 673,659, filed May 31, 1946.

In the case of relatively small installations where it may not be feasible to provide multiple combined heater and heat exchanger sections, the cleaning of the tubes including both the combustion tubes and the sludge or supernatant heating tubes may be completed in a few hours, during which time the heating of the digester may be omitted since the loss in temperature during this short period would be so slight that it could be easily made up when the unit is returned to service.

While the heat for the water bath in the heat exchanger 15 is herein shown as obtained from the combustion of gas generated during the digestion of the sludge, such heat may be obtained in other ways. For example, where such gas is utilized in internal combustion engines, it is possible to utilize the heat from the water in the cooling jacket of the engine by circulating such water through one of the sections of the heat exchanger as the water bath, maintaining a temperature most suitable to the gas engine operation. In this case the combustion coil should either be omitted or remain idle, since the heat given up to the circulated material for heating the digester would also result in a cooling of the circulated water to serve the purpose of cooling the engine. Heat from exhaust gases of the internal combustion engine may also be recovered by passing them through the flues of an additional section of the heat exchanger heretofore described.

I claim:

1. The method of biologically digesting sewage sludge or trades waste material containing digestible organic components which comprises introducing material to be digested into a digestion zone containing micro-organisms capable of digesting said components, circulating material from the digestion zone at a predetermined velocity along a closed path of substantially uniform cross section through and in heat transfer relation with a heating zone externally of any digestion zone to heat the material to above the optimum temperature for digestion by said micro-organisms and returning the heated material to the digestion zone at a sufficient rate to maintain the digesting mass at substantially the optimum temperature for digestion by said micro-organisms.

2. The method of maintaining the contents of a sewage sludge digestion tank at the optimum temperature for biological digestion, which comprises heating raw sewage sludge and adding the heated raw sludge to the contents of the tank during selected periods, and between such periods withdrawing material from said tank, heating the withdrawn material by circulating it through and in heat transfer relation to a heating medium externally of said tank along a closed path of substantially uniform cross-section at the portion of the path which extends through the heating medium to heat such material to above the optimum temperature for biological digestion while circulating such material at a sufficient rate to prevent caking and to provide turbulence and thereby an increased coefficient of heat transfer between said heating medium and said material, and returning the heated material to said tank at a sufficient rate to maintain the contents of the tank at substantially the optimum temperature for digestion.

3. The method of maintaining the contents of a sewage sludge digestion tank at the optimum temperature for biological digestion, which comprises withdrawing biologically digesting material from the tank, mixing raw sewage sludge with said withdrawn material to initiate biological digestion of the raw sludge, heating the mixture externally of any digestion tank to above the optimum temperature for digestion by passing it through a heating medium along a confined path of substantially uniform cross-section at that portion of the path at which the mixture is heated and adding the heated mixture to the contents of the tank at a sufficient rate to maintain the contents of the tank at substantially the optimum temperature for digestion, the entire heating supplied to the material in said tank in excess of any biologically developed heat being furnished by the heated mixture added to said tank.

4. The method of biologically digesting waste material containing biologically digestible organic components which comprises introducing the material to be digested into a biological digestion tank for digestion therein, withdrawing material from the digestion tank, heating the withdrawn material to a temperature above the optimum temperature for biological digestion of the material in said tank by passing it through and in heat transfer relation with a heating medium externally of the tank along a confined path of substantially uniform cross-section at that portion of the path at which the material is heated, said material being passed along said path at a sufficiently high velocity to prevent caking of the solids thereof, and returning the heated material directly to the digesting mass in said digestion tank in substantially the same condition, except for the added heat, as withdrawn from said tank at a rate sufficient to maintain the temperature of said digesting mass at an optimum point between approximately 85° F. and 100° F.

5. The method of biologically digesting waste material containing biologically digestible organic components which comprises withdrawing biologically digesting material from the biologically digesting mass in a digestion tank during selected periods, mixing the withdrawn material with raw waste material prior to introduction thereof into said tank to initiate biological digestion of the raw waste material, heating the mixture externally of said tank while circulating the mixture along a confined, predetermined path of substantially uniform cross-section at that portion of the path at which the mixture is heated and at a relatively high velocity, sufficient to prevent caking of the solids thereof and to provide increased heat transfer, introducing the heated mixture into said tank, and between said periods, withdrawing material from said tank, heating said withdrawn material to above the optimum temperature for digestion and returning said heated, withdrawn material only to said tank to maintain said mass substantially at the optimum temperature for digestion.

6. The method of biologically digesting waste material containing biologically digestible organic components which comprises introducing the waste material to be digested into a biological digestion zone, withdrawing biologically digesting material from said digestion zone at a point a substantial distance above the bottom of said zone, circulating the withdrawn material along a closed path at a predetermined velocity through a heating medium disposed externally of the digestion zone and outside and surrounding the flow path of the material being circulated but in heat transfer relation therewith to heat the circulated material to above the optimum temperature for biological digestion of the material in said digestion zone, said flow path being of substantially uniform cross-section through said heating medium and delivering the heated material above the level of the material in the digestion zone at a rate sufficient to maintain the material in said digestion zone substantially constantly at the optimum temperature for maximum biological digestion.

7. The method of biologically digesting waste material containing biologically digestible organic components which comprises introducing raw waste material to be digested into a settling zone to settle out the sludge, delivering the settled sludge to a biological digestion zone substantially free of air and containing micro-organisms capable of biologically digesting said components, withdrawing material from said digestion zone, circulating the withdrawn material through a heating zone externally of any digestion zone, along a closed path of substantially uniform cross-section at the portion which extends through the heating zone, heating the material while in said heating zone to above the optimum temperature for digestion by said micro-organisms, and delivering said withdrawn and heated material to said digestion zone at a different level than that at which withdrawn at a rate to maintain the material in said digestion zone substantially uniformly at a substantially constant temperature within the range between approximately 85° F. and approximately 100° F.

HARRY E. SCHLENZ.

REFERENCES CITED

The following references are of record in the file of this patent:

UNITED STATES PATENTS

| Number | Name | Date |
|---|---|---|
| 126,722 | Luquet et al. | May 14, 1872 |
| 1,399,561 | Imhoff et al. | Dec. 6, 1921 |
| 1,717,100 | Downes | June 11, 1929 |
| 1,806,698 | Miller | May 26, 1931 |
| 1,847,589 | Brobeck | Mar. 1, 1932 |
| 1,908,042 | Moore | May 9, 1933 |
| 1,912,595 | Schlenz | June 6, 1933 |
| 1,925,398 | Moore | Sept. 5, 1933 |
| 1,929,179 | Piatt | Oct. 3, 1933 |
| 1,930,457 | Pruss | Oct. 10, 1933 |
| 1,954,625 | Hellstrom | Apr. 10, 1934 |
| 1,987,888 | Babbitt et al. | Jan. 15, 1935 |
| 1,989,589 | Fischer et al. | Jan. 29, 1935 |
| 1,997,980 | Smith | Apr. 16, 1935 |
| 2,008,839 | Samson | July 23, 1935 |
| 2,029,702 | Buswell, Jr. | Feb. 4, 1936 |
| 2,035,447 | Altick | Mar. 31, 1936 |
| 2,090,405 | Shook | Aug. 17, 1937 |
| 2,143,755 | Archer | Jan. 10, 1939 |
| 2,190,598 | Fischer | Feb. 13, 1940 |
| 2,348,670 | Woodward | May 9, 1944 |

FOREIGN PATENTS

| Number | Country | Date |
|---|---|---|
| 376,697 | Germany | of 1923 |

OTHER REFERENCES

Bach, Sewage Works Journal, October 1931, page 566 all required, published by Federation of Sewage Works Associations, Prince and Lemon Streets, Lancaster, Pa.

Keefer, English and German Sewage Treatment—II, in Engineering News-Record, August 7, 1930, edition, pages 218–219, published by McGraw-Hill Publishing Co., New York, N. Y.

Metcalf and Eddy, American Sewerage Practice, vol. III, published by McGraw-Hill Book Co., Inc., New York, N. Y., 1935, pages 424, 425, and 428.

Sphar, New Digester Techniques, in the American City, October 1948 edition, pages 84 and 85. (This article is exhibit 20 of the documentary material made of record December 3, 1948), published by The Civic Press, New York, N. Y.